United States Patent
Zhai et al.

(10) Patent No.: US 7,944,503 B1
(45) Date of Patent: May 17, 2011

(54) INTERLACED-TO-PROGRESSIVE VIDEO PROCESSING

(75) Inventors: Fan Zhai, Richardson, TX (US); Weider P. Chang, Hurst, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1105 days.

(21) Appl. No.: 11/627,710

(22) Filed: Jan. 26, 2007

Related U.S. Application Data

(60) Provisional application No. 60/762,618, filed on Jan. 27, 2006.

(51) Int. Cl.
*H04N 7/01* (2006.01)
*H04N 11/20* (2006.01)
*H04N 5/14* (2006.01)
*H03L 7/00* (2006.01)

(52) U.S. Cl. ......... 348/452; 348/542; 348/699; 348/700
(58) Field of Classification Search .................. 348/452, 348/699, 700, 701; 382/192, 199
See application file for complete search history.

(56) References Cited

U.S. PATENT DOCUMENTS

| | | | |
|---|---|---|---|
| 7,324,160 B2 * | 1/2008 | Yang ............................. 348/542 |
| 7,796,191 B1 * | 9/2010 | Vojkovich ..................... 348/448 |
| 2005/0179814 A1 * | 8/2005 | Pau et al. ...................... 348/448 |

* cited by examiner

*Primary Examiner* — Jefferey Harold
*Assistant Examiner* — Chandraika Sugrim
(74) *Attorney, Agent, or Firm* — Mirna Abyad; Wade J. Brady, III; Frederick J. Telecky, Jr.

(57) ABSTRACT

An edge direction vector determination, which can be used for video interlaced-to-progressive conversion by motion-adaptive interpolation, has a coarse edge vector determination over a large search window followed by a fine edge vector determination over a small window plus confidence level assessment for field interpolation.

5 Claims, 13 Drawing Sheets

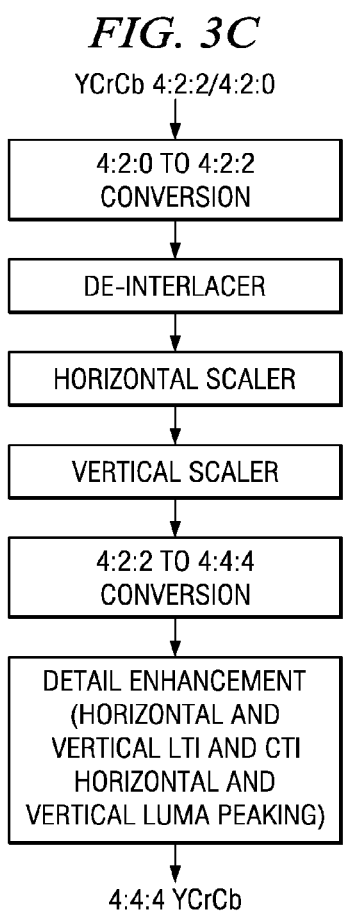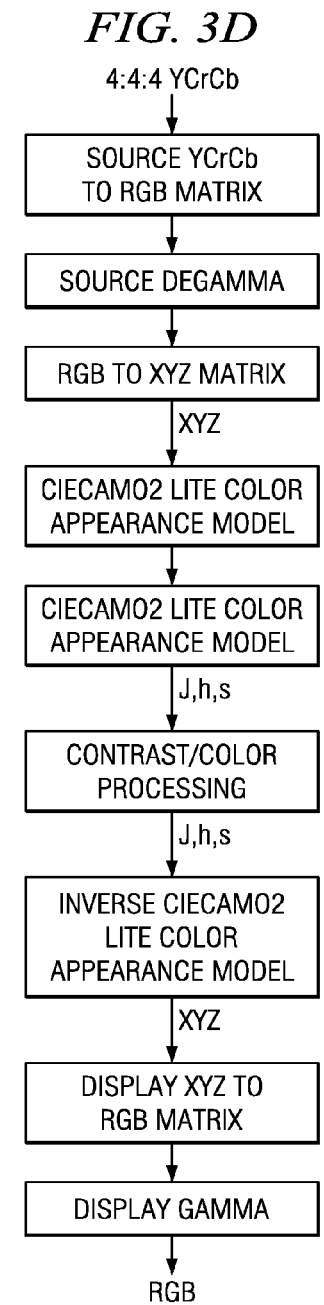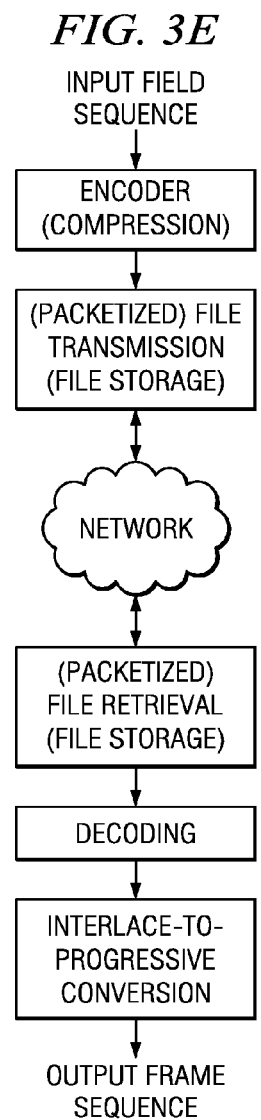

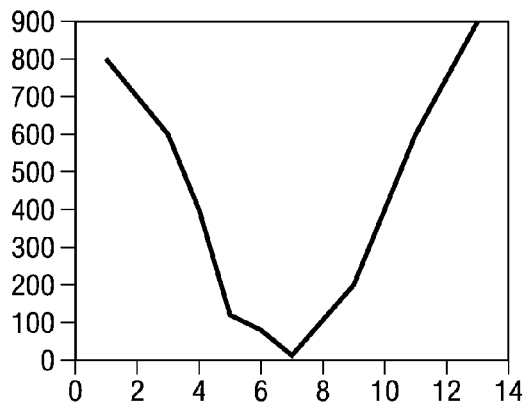
*FIG. 5A*
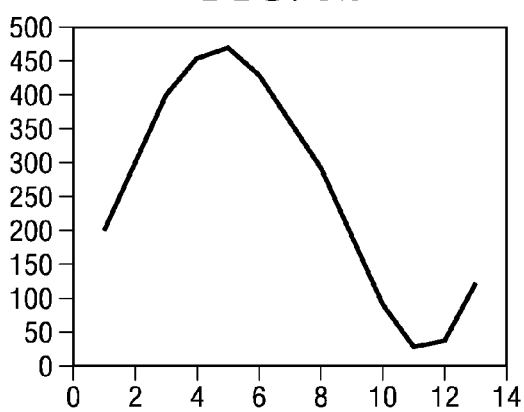
*FIG. 5B*
*FIG. 5C*
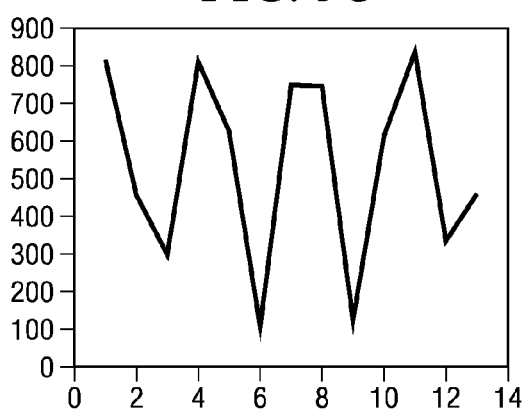
*FIG. 5D*
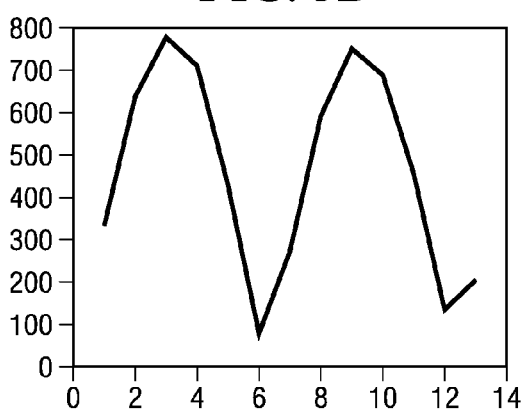

INTERLACED-TO-PROGRESSIVE VIDEO PROCESSING

CROSS-REFERENCE TO RELATED APPLICATIONS

This application claims priority from provisional patent Appl. No. 60/762,618, filed Jan. 27, 2006. The following co-assigned, copending patent application discloses related subject matter: application Ser. No. 11/550,100, filed Oct. 17, 2006.

BACKGROUND OF THE INVENTION

The present invention relates to digital video signal processing, and more particularly to interlaced and progressive video formats.

For video systems, interlaced format is widely used to reduce data rate. FIG. 2A illustrates interlaced video format where t denotes time, x horizontal position, and y vertical position. An interlaced video signal consists of a sequence alternating between the two kinds of fields: the even-parity fields which contain the lines with even line numbers, i.e., y=even ("Top Field"), and the odd-parity fields which contain the lines with odd line numbers ("Bottom Field"). For example, NTSC interlaced television sets display 60 fields per second with each field containing 262-263 lines of which about 240 are active.

FIG. 2B shows a progressive video format frame, which recent high-quality TV sets use to display video programs. In progressive format, a frame which contains all of the line data, is displayed all at once. NTSC progressive TV sets display 60 progressive frames per second with about 720×480 active pixels per frame. However, most video programs are broadcast in interlaced format, and thus interlaced-to-progressive conversion (de-interlacing) is required to display a broadcast TV program on a progressive TV set. Essentially, skipped lines in the interlaced fields need to be filled in by interpolation to yield progressive frames.

Generally, de-interlacing methods can be classified into one of five categories: (1) spatial (intra-frame) techniques;(2) temporal (inter-frame) techniques; (3) spatial-temporal techniques; (4) motion-detection based techniques; and (5) motion-compensation based techniques.

The traditional spatial, temporal, and spatial-temporal interpolation schemes usually lead to poor conversion performance. The spatial interpolation does not utilize the full achievable vertical-temporal (V-T) bandwidth in filtering because it ignores the temporal spectrum, which reduces the vertical resolution. The temporal interpolation, however, causes artifacts such as jaggy and feather effects when motion is present. Although the spatial-temporal interpolation can fully utilize the V-T spectrum, it cannot handle motion scenes well.

Thus, motion adaptive techniques of categories (4)-(5) are generally advantageous. The most advanced de-interlacing techniques usually make use of motion estimation and compensation. Motion compensation allows virtual conversion of a moving sequence into a stationary one by interpolating along the motion trajectory. However, this type of technique is of much higher complexity in implementation.

On the other hand, interlaced sequences can be essentially perfectly reconstructed by temporal filtering in the absence of motion, while spatial filtering performs well in the presence of motion. Motion-detection based methods use a motion detector to take advantage of the above-mentioned facts by classifying each pixel as in either a moving or a stationary (still) region. Based on the output of the motion detector, the de-interlacing method then blends between the temporal filtered output and the spatial filtered output.

FIG. 3A is a block diagram of a generic interlaced-to-progressive converter employing motion detection. The converter converts input interlaced video source to progressive video format that contains the original interlaced lines plus interpolated lines. The frame buffer stores several interlaced fields. The motion detector detects moving objects in the input fields pixel-by-pixel. The motion detector calculates the level of motion at every pixel location where the pixel data needs to be interpolated. The more obvious the motion is, the higher motion level becomes. The still-pixel generator and the moving-pixel generator interpolate pixels by assuming, respectively, that the pixel being interpolated is a part of a still object or a moving object. The selector/blender block selects or blends the outputs of the still-pixel generator and the moving-pixel generator using the level of motion. When the motion level is low, the output of the still-pixel generator is selected or the blending fraction of the output of the still-pixel generator in the interpolated output data becomes high.

The still-pixel generator is realized by an inter-field interpolator. The moving-pixel interpolator consists of an intra-field interpolator plus an edge-direction detector. The edge-direction detector detects the edge direction (edge vector) at the detection pixel in the pattern of an object in the field and outputs the detected direction to the intra-field interpolator. The intra-field interpolator calculates a pixel value using the detected direction, by interpolating pixels along in the detected direction (edge vector). (Without a direction, the interpolator could simply interpolate using the two closest pixels in the field.) The spatial resolution of the inter-field interpolator is higher than that of the intra-field interpolator. But when an object which includes the pixel being generated by interpolation is moving, i.e., the motion level is high, the inter-field interpolator causes comb-like artifacts and the output of the intra-field interpolator is selected or the blending fraction of the output of the intra-field interpolator is set as high.

Spatial correlations between two lines are used to determine the edge direction (edge vector) and thus the direction of interpolation in typical methods. If a vertical correlation is found, it is interpreted as an edge along the direction of detected correlated regions. Interpolation is then performed along this detected edge to create smooth angular lines, as shown in FIG. 4A. If no correlations are found, a spatial-temporal median filter is usually employed to maintain crisp horizontal edges. Generally, edge-adaptive interpolation can be described as $$F^{(int)}(j,i,n)=[F(j+1,i-k,n)+F(j-1,i+k,n)]/2$$

where i is the column number, j is the line number, n is the field number, and k is the offset which provides the maximum correlation.

Generally, the orientation of an edge is determined by observing the results of several luminance correlations. If the difference between two neighboring pixels is large, it is assumed that there is an edge between them. Conversely, if the difference between two neighboring pixels is small, it is assumed that the two pixels lie on the same side of an edge. The sum of absolute differences (SAD) between two lines within the current field is usually used to denote the amount of correlation. More accurate metrics, such as squared differences, can also be used, but these need additional computation complexity.

It is still uncertain whether a zero difference between two neighboring pixels indicates the spatial direction in which the signal is stationary, or is a result of the alias edge detection or motion. A more complicated edge detection technique also checks the edge orientations at the neighboring pixels. However, these techniques usually have poor performance when the actual edge is beyond the search window. For example, as shown in FIG. 4B, if we use the window size of 2×3, (the small rectangle), we are unable to detect the correct edge. In this case, we have to increase our search window to at least 2×11 (the big rectangle) to cover the edge vector in the example.

But increased window size usually leads to significantly increased computation complexity, especially if we look for fractional-pixel resolution edge vectors, such as half-pixel or quarter-pixel resolution edge vectors. There are some proposed methods aimed to balance the computation complexity and accuracy of edge detection. One example is U.S. Pat. No. 6,731,342 in which a 2×15 observation is used to detect edges. Techniques based on gradient and rule are used to roughly detect the range of an edge and then region matching is employed to accurately calculate the edge. In the region matching stage, a sliding window is used to perform difference comparisons to denote the correlation level. The sliding window moves with ¼ pixel degree, thus resulting in high computation complexity.

When a bigger search window is used, additional protection is usually needed because it is more likely to yield ambiguous edge candidates. A weighted sum of interpolated pixel values based on different edge vectors can be used when multiple directions are found. Generally speaking, the weighting factor depends on statistics, which requires a training process. Uniform weighting factors can be used. Another solution can be found in U.S. Pat. No. 6,133,957, where ambiguity and confidence tests are employed to deal with ambiguous edge detection that results from using big search windows. However, this scheme does not provide fractional-pixel resolution edge vector detection.

In short, these known methods of spatial interpolation for de-interlacing systems have have high computational complexity or insufficient performance.

SUMMARY OF THE INVENTION

The present invention provides edge detection for motion-adaptive interlaced-to-progressive conversion with hierarchical edge vector determination.

BRIEF DESCRIPTION OF THE DRAWINGS

FIGS. 3A-3E illustrates a generic motion-adaptive interlaced-to-progressive converter, a processor, and network communication.

FIGS. 5A-5D show correlation variations.

DESCRIPTION OF THE PREFERRED EMBODIMENTS

1. Overview

Preferred embodiment methods provide hierarchical edge vector determination, edge-directed interpolation using the edge vectors, and interlaced-to-progressive conversion (de-interlacing) using the edge-directed interpolation. Edge vector determinations first detect a pixel-resolution edge orientation by searching a large window and then calculate a fractional-pixel-resolution edge vector refinement using a small window defined from translation by the detected pixel-resolution edge orientation. The search window size should be big enough to cover a large range of edge angles; a window size of about 2×17 results in a good tradeoff between the computation complexity and detection accuracy. In such a big window, we cannot afford very accurate edge vector detection, so detect only pixel-resolution edge vectors using the big window. After the pixel-resolution edge vector is determined, reduce the window size to 2×3 (translation according to the detected pixel-resolution edge vector) and look for accurate edge vectors, such as in half-pixel or quarter-pixel resolution. We could also calculate fractional-pixel edge vector with infinite resolution by employing some parametric modeling, e.g., line-shift model.

The preferred embodiment methods also provide a comprehensive confidence level determination to deal with detected ambiguous pixel-resolution edges; when the confidence factor is low, an alternative small window edge vector is used. This achieves very accurate edge vectors with moderate computation complexity.

Figure 1A:
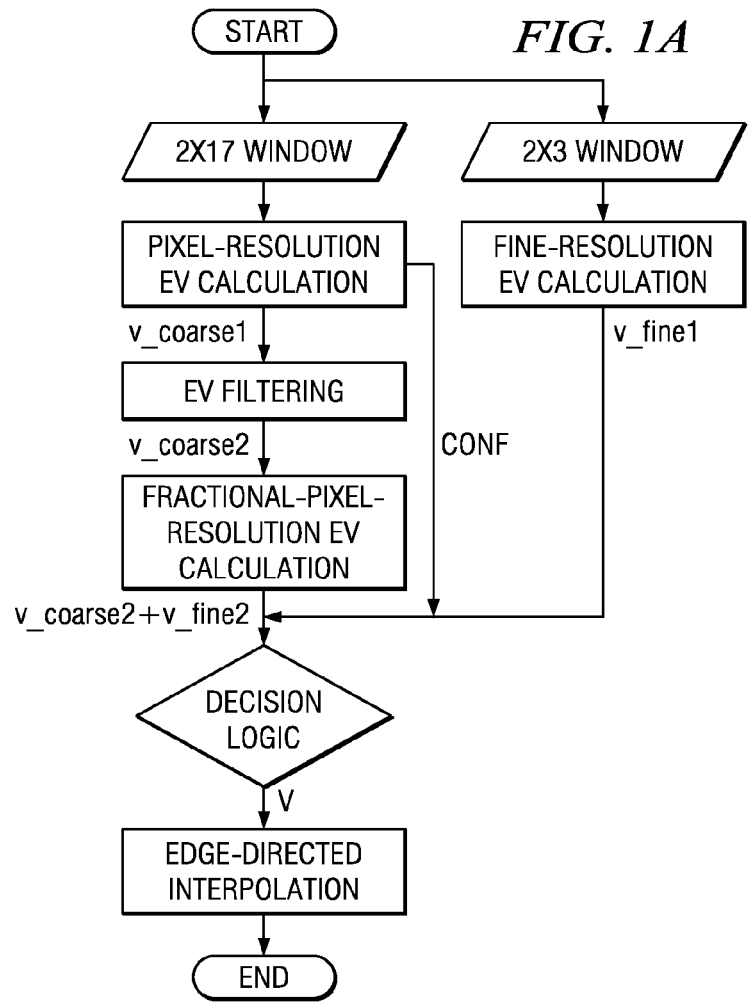
FIGS. 1A-1E are a flowchart and functional block diagram of a first preferred embodiment edge vector detection system and method.
Figure 1D:
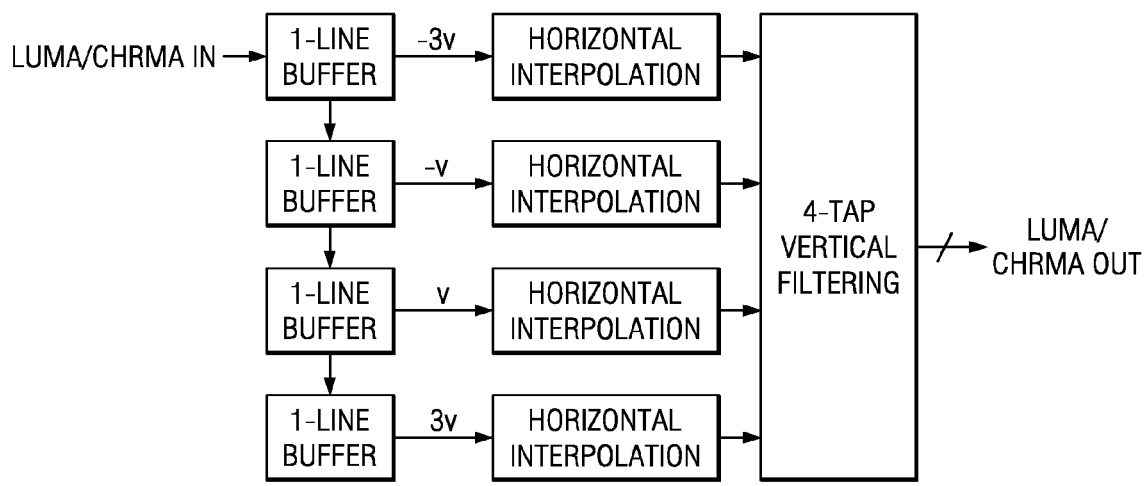
Figure 1B:
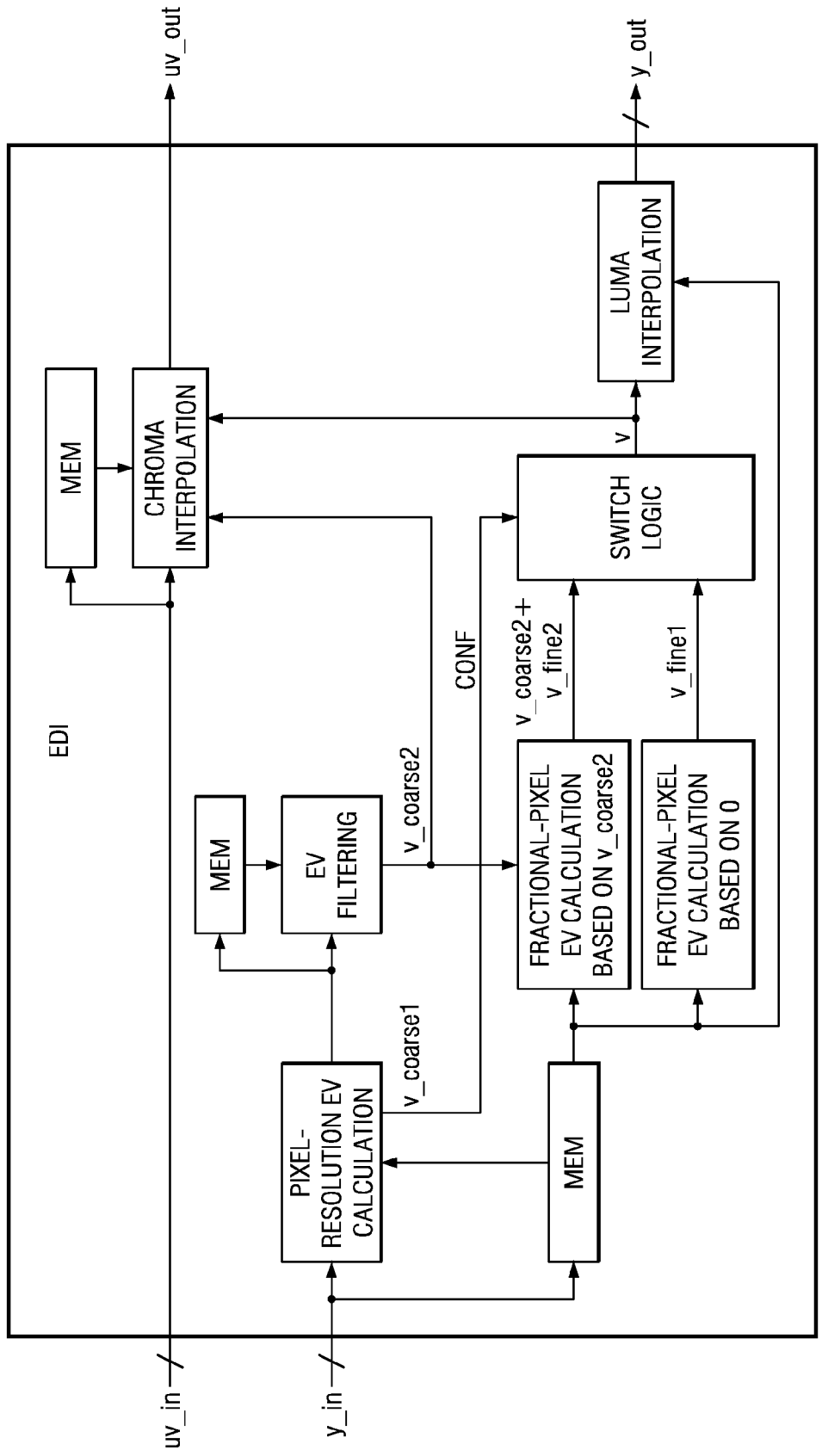

FIG. 1A is a flowchart, and FIG. 1B is a top-level block diagram implementation. In these figures "v_coarse1" denotes the large window pixel-resolution edge vector; "v_coarse2" denotes a filtering of v_coarse1 to remove anomalies; "v_fine2" denotes the small window fractional-pixel-resolution refinement, so the net large window edge vector would be v_coarse2+v_fine2; "conf" denotes a confidence measure for using the large window edge vector; "v_fine1" denotes an independently determined edge vector in a small window which would be used when the confidence in the large window edge vector is low; and "v" is the final edge vector and equal to either v_fine1 or v_coarse2+v_fine2, depending upon the confidence level. The line-shift model method could be used to determine the small window edge vectors, v_fine1 and v_fine2. The large window could be 2×17, the fractional-pixel refinement window (moderate window) could be 2×3, and the small window also 2×3. FIGS. 1D-1E are functional block diagrams of an implementation of spatial interpolation along the edge vector v.

The edge vectors and the associated confidence factors can also be used for back-end processing after de-interlacing, such as detail enhancement, edge sharpening, and scaling.

Figure 3A:
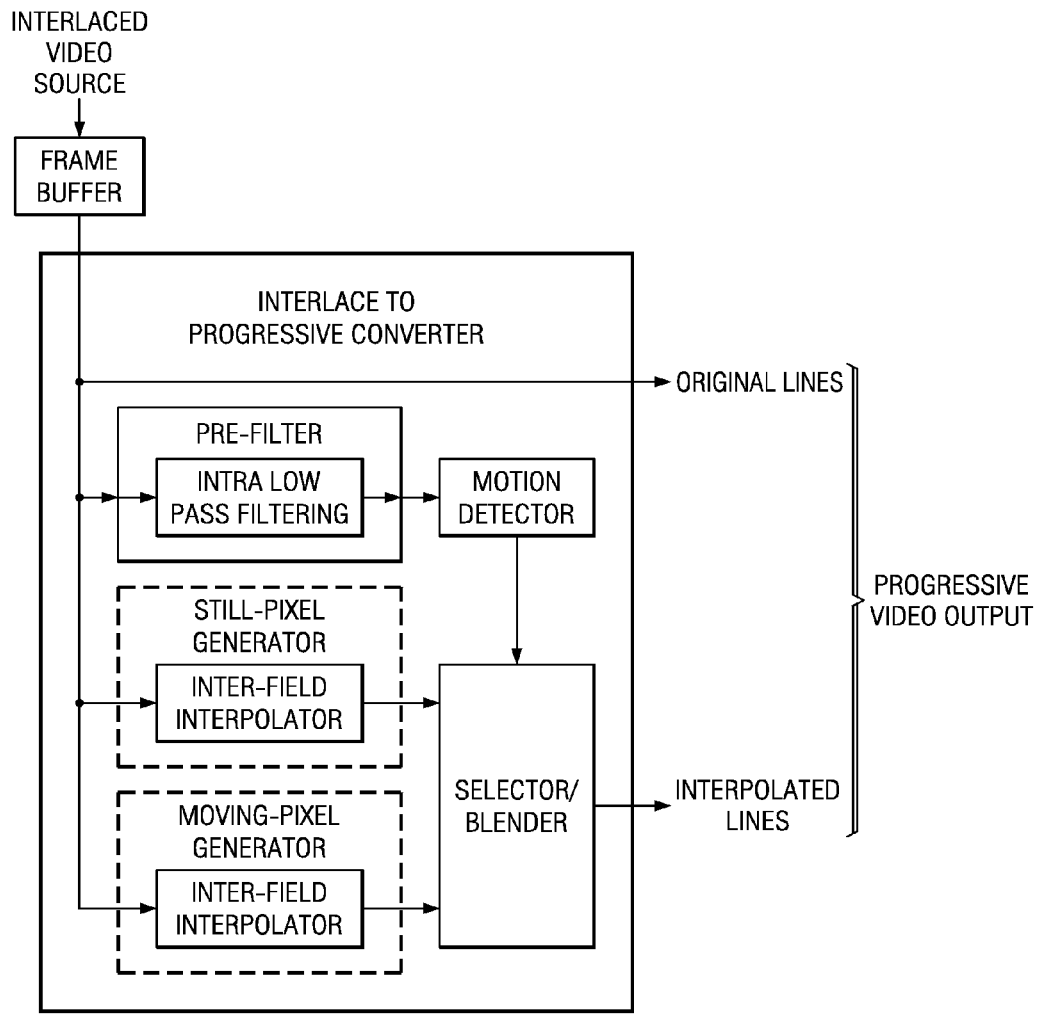

Preferred embodiment de-interlacing is motion-adaptive (e.g., FIG. 3A) and the intra-field interpolator uses the preferred embodiment edge vector determination and interpolation along the edge vector.

Figure 3B:
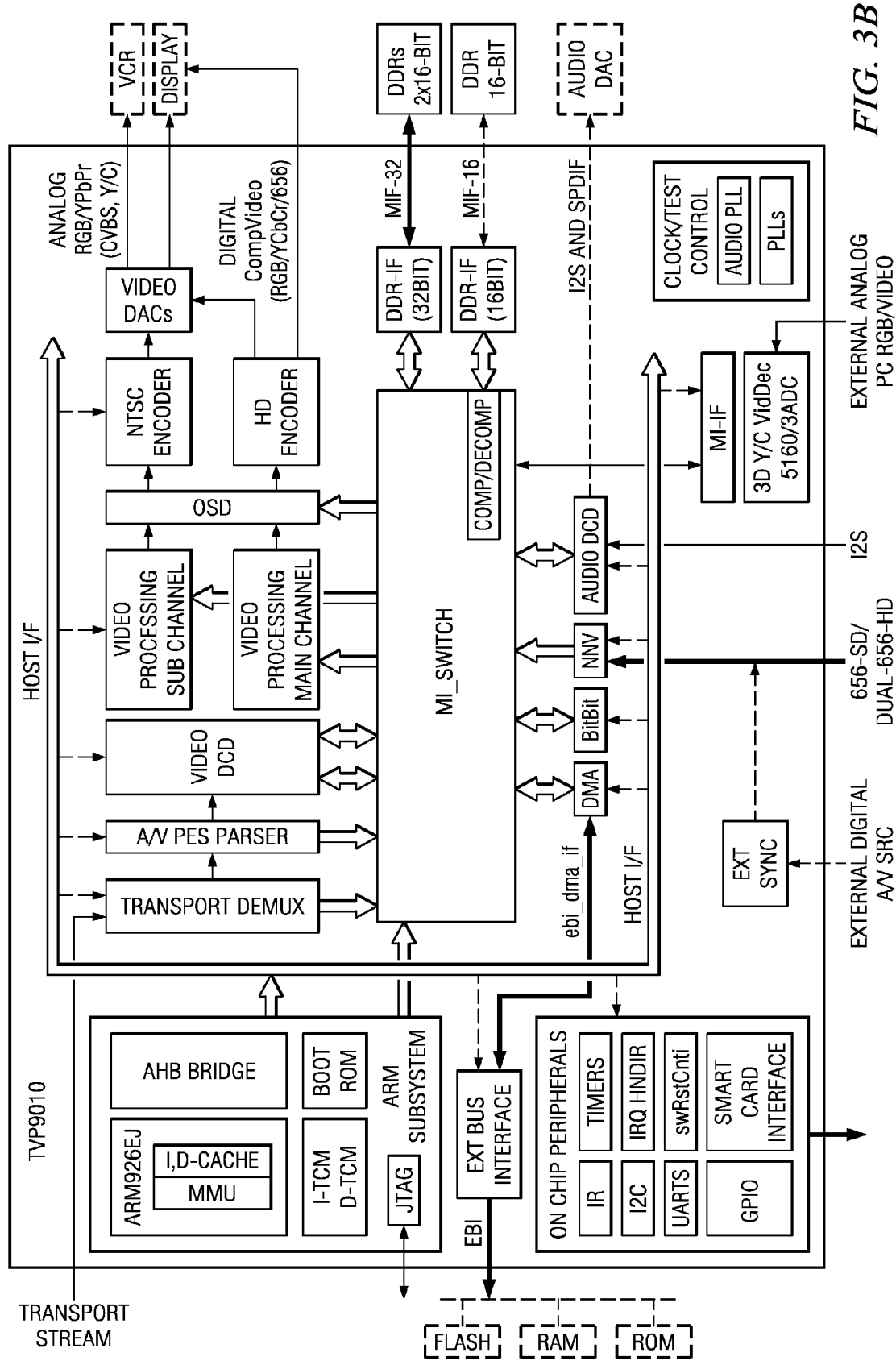

Preferred embodiment systems such as TV phones, PDAs, notebook computers, etc., perform preferred embodiment methods with any of several types of hardware: digital signal processors (DSPs), general purpose programmable processors, application specific circuits, or systems on a chip (SoC) such as combinations of a DSP and a RISC processor together with various specialized programmable accelerators. FIG. 3B is a block diagram of an example processor with FIGS. 3C-3D more details of the display unit. A stored program in an onboard or external (flash EEP)ROM or FRAM could implement the signal processing. Analog-to-digital converters and digital-to-analog converters can provide coupling to the real world, modulators and demodulators (plus antennas for air interfaces) can provide coupling for transmission waveforms, and packetizers can provide formats for transmission over networks (e.g., Internet) as illustrated in FIG. 3E.

2. Pixel-Resolution Edge Vectors and Confidence Factors

Denote the location of the pixel to be found by interpolation as (j,i), which means the vertical (line) location index is j and the horizontal location index is i. In the following, we only consider the information of one field and spatial interpolation, so the field index n will be omitted for a simpler representation. The search window for calculating an initial pixel-resolution edge vector at (j,i) will be the 17 pixels above and the 17 pixels below (j,i). That is, the search window includes pixel luminance values $F(j-1,i-k)$ for $8 \geq k \geq -8$ and $F(j+1,i-k)$ for $8 \geq k \geq -8$, with these pixel locations shown in FIG. 4C. Within the window, we compare the correlations of pairs of 5 pixel blocks on each line to determine the most correlated orientation, which should correspond to the edge vector. In order to generate a valid edge vector for the pixel being interpolated, these pairs of 5 pixel blocks should be symmetric about (j,i). That is, we first calculate the correlation between the left-most 5 pixels on the top line [(j-1,i-8), (j-1,i-7), (j-1, i-6), (j-1,i-5), (j-1,i-4)] and the right-most 5 pixels on the bottom line [(j+1,i+4), (j+1,i+5), (j+1,i+6), (j+1, i+7), (j+1,i+8)], shown as the sliding windows in FIG. 4C. Then we shift the sliding window of the top line to the right and the sliding window of the bottom line to the left by one pixel at the same time. We evaluate the correlation of those two 5-pixel blocks, and then keep shifting and correlating the two blocks. By doing so, we can evaluate the correlations of 13 pairs of 5-pixel blocks, which correspond to 13 edge vectors ranging from −6 to 6 (i.e., a vector with horizontal vector component ranging from −6 to 6 and with vertical vector component always equal to +1, despite the row index increasing downwards).

Due to computation complexity considerations, we use the sum of absolute differences (SAD) to denote the amount of correlation. In particular, a SAD is taken between the respective pixels in the two sliding 5-pixel blocks for each possible vector component w:

$$SAD(w) = \Sigma_{-2 \leq m \leq 2} |F(j-1,i+w+m) - F(j+1,i-w+m)|$$

Figure 4A:
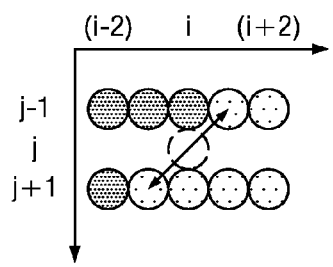
FIGS. 4A-4J show pixel correlations for edge detections.
Figure 4D:
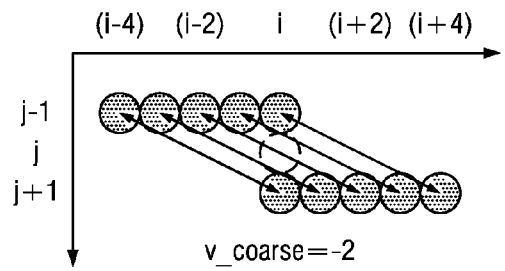
Figure 4B:
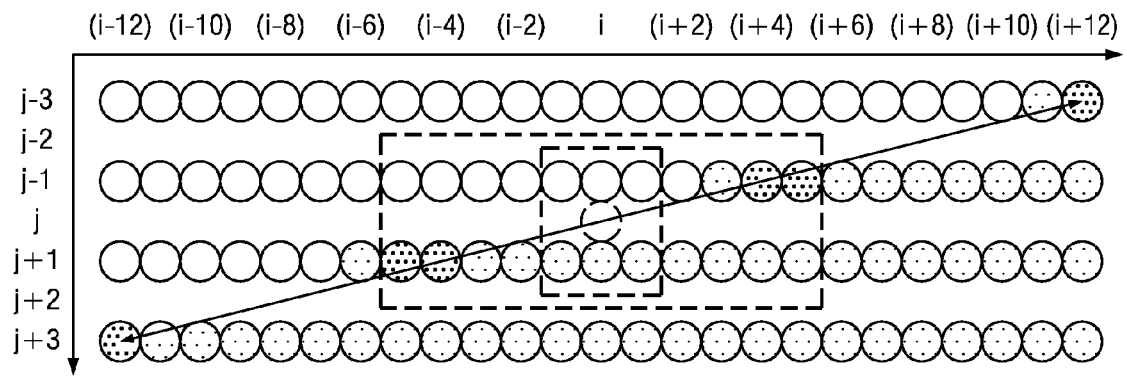
Figure 4C:
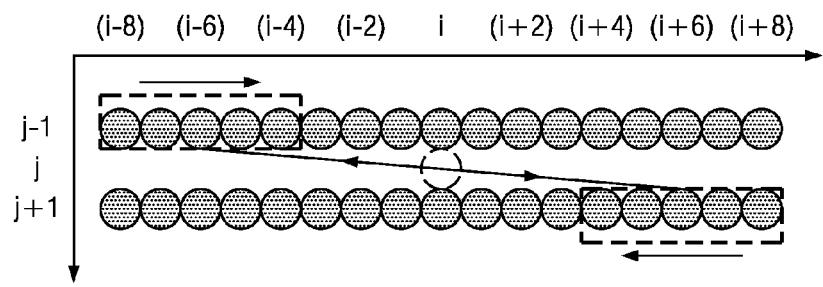
Figure 4E:
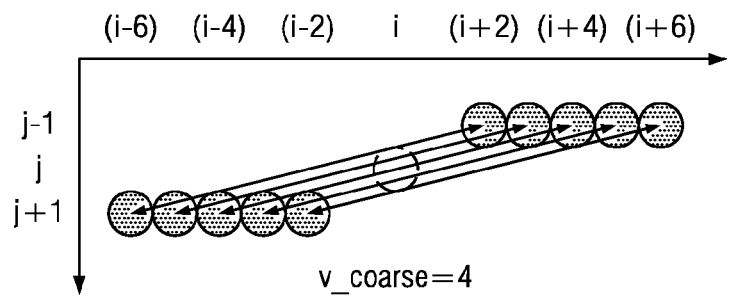

Among the 13 resulted SADs, the minimum SAD will determine the most correlated pair of 5-pixel blocks and its associated vector will be the resultant pixel-resolution edge vector. Two examples are shown in FIGS. 4D-4E. Note that besides SAD, other metrics may also be used to denote the correlation of the two sliding 5-pixel blocks, such as squared error, products of normalized pixel values, etc., which are usually more computationally expensive.

Figure 6:
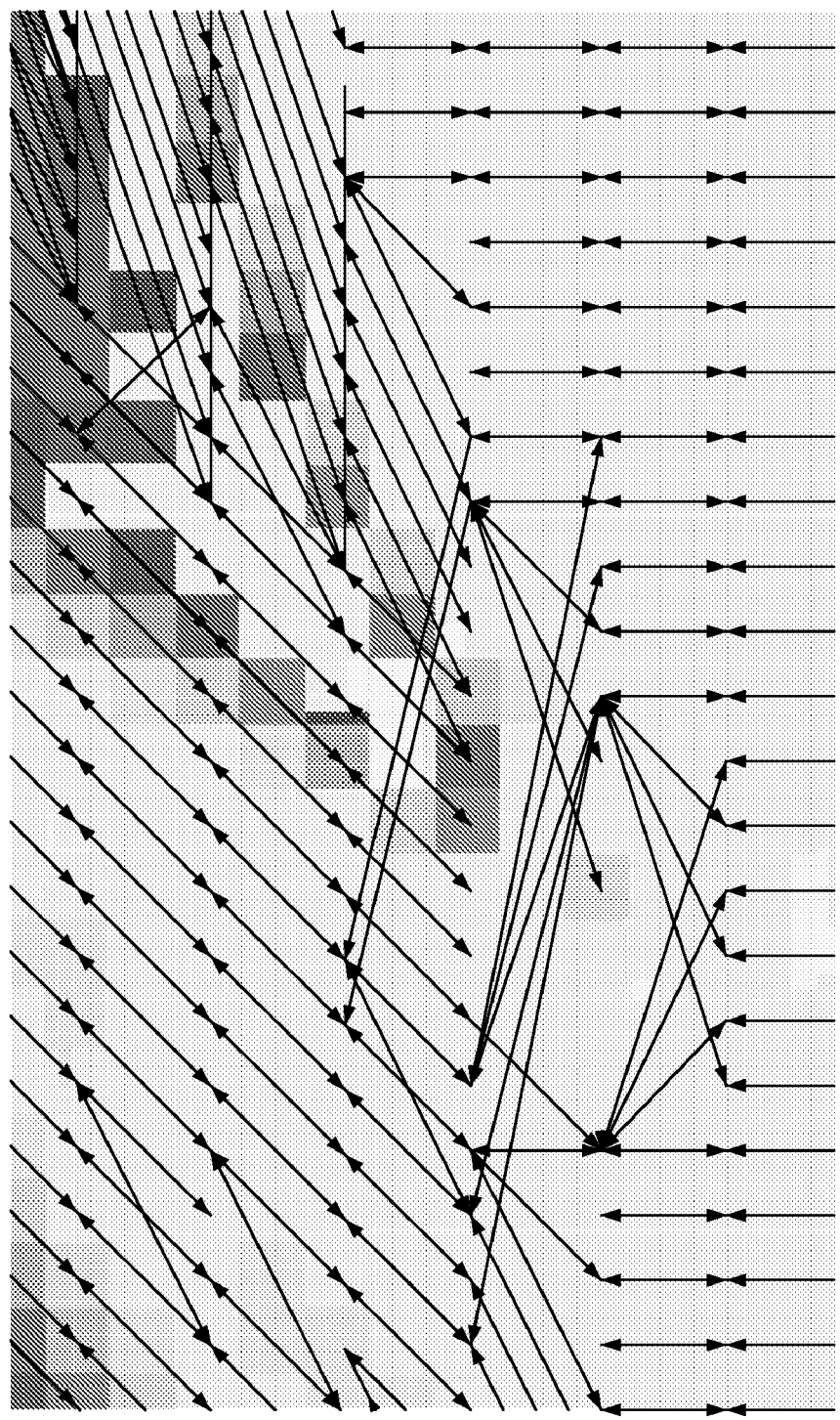
FIG. 6 illustrates edge vectors for an object with a corner.

If the graph of the 13 SADs has only one minimum such as the examples shown in FIGS. 5A-5B, it is a simple problem. In these cases, we can simply decide the edge vector that corresponds to the minimum. However, if the curve of the 13 SADs has more than one period of up and down (more than one minimum and maximum, etc.) such as the examples shown in FIGS. 5C-5D, then it is likely that this area is a busy area with texture or objects smaller than the window of 2×17. For this reason, we usually need to classify the big window search results into different cases. Basically, we want to differentiate the strong edge area from busy area, such as texture or small objects, to avoid wrong detection. An example that might cause mis-detection is shown in FIG. 6, where the sharp tip of the object is smaller than 2×17. By using a 2×17 search window, the most highly correlated pairs are across the object, which is obviously wrong.

In effect, we need to detect the high frequency area that will lead to low-confident edge vector detection in using the big window. This can be generally achieved by performing spectrum analysis. One method is to use some transformation, e.g., DFT transform or the Walsh-Hadamard transform, to transform the signal into spectrum domain. Another method is to perform spectral analysis directly in the time domain based on the 13 SAD results.

Figure 1C:
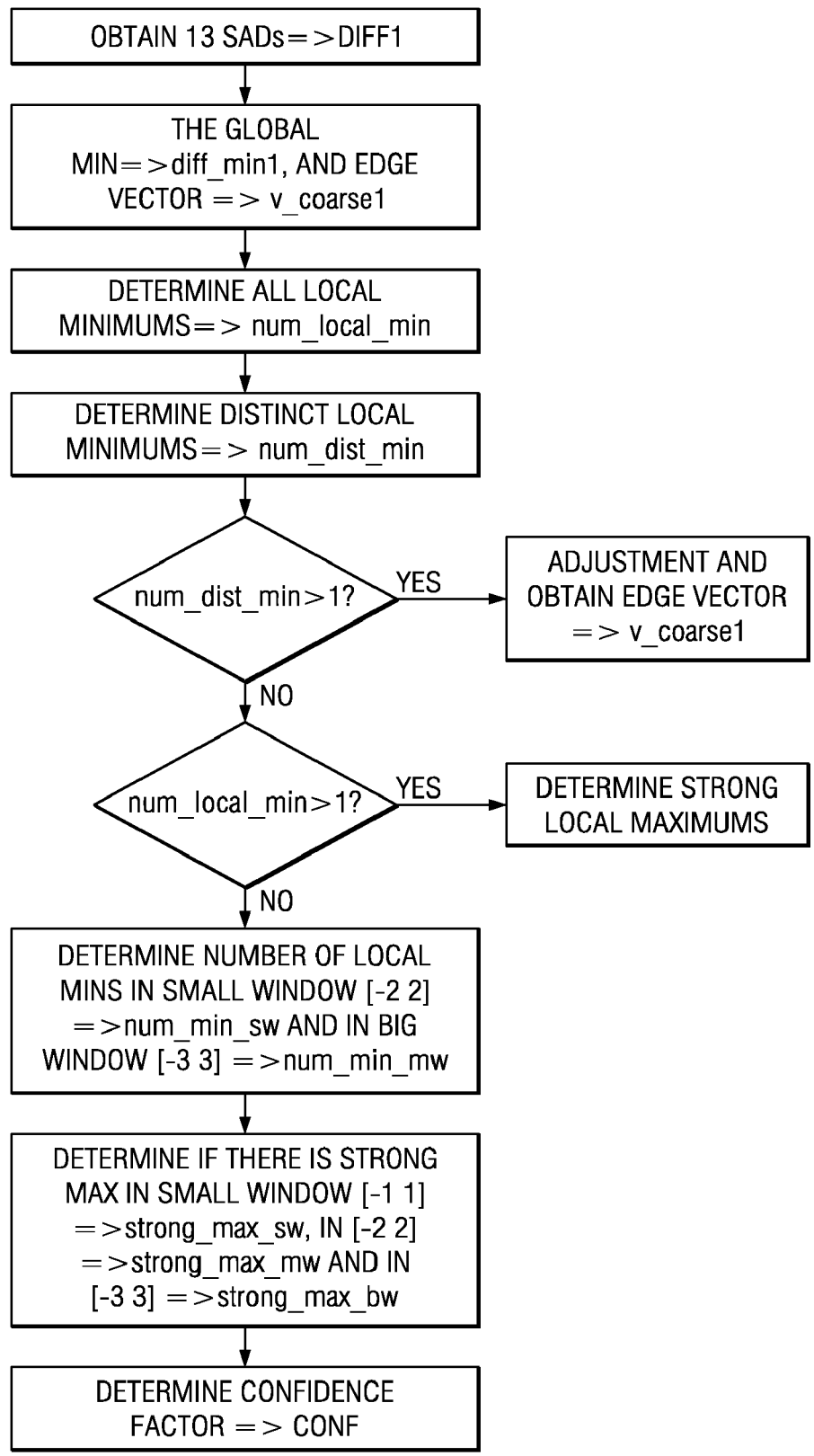
Figure 1E:
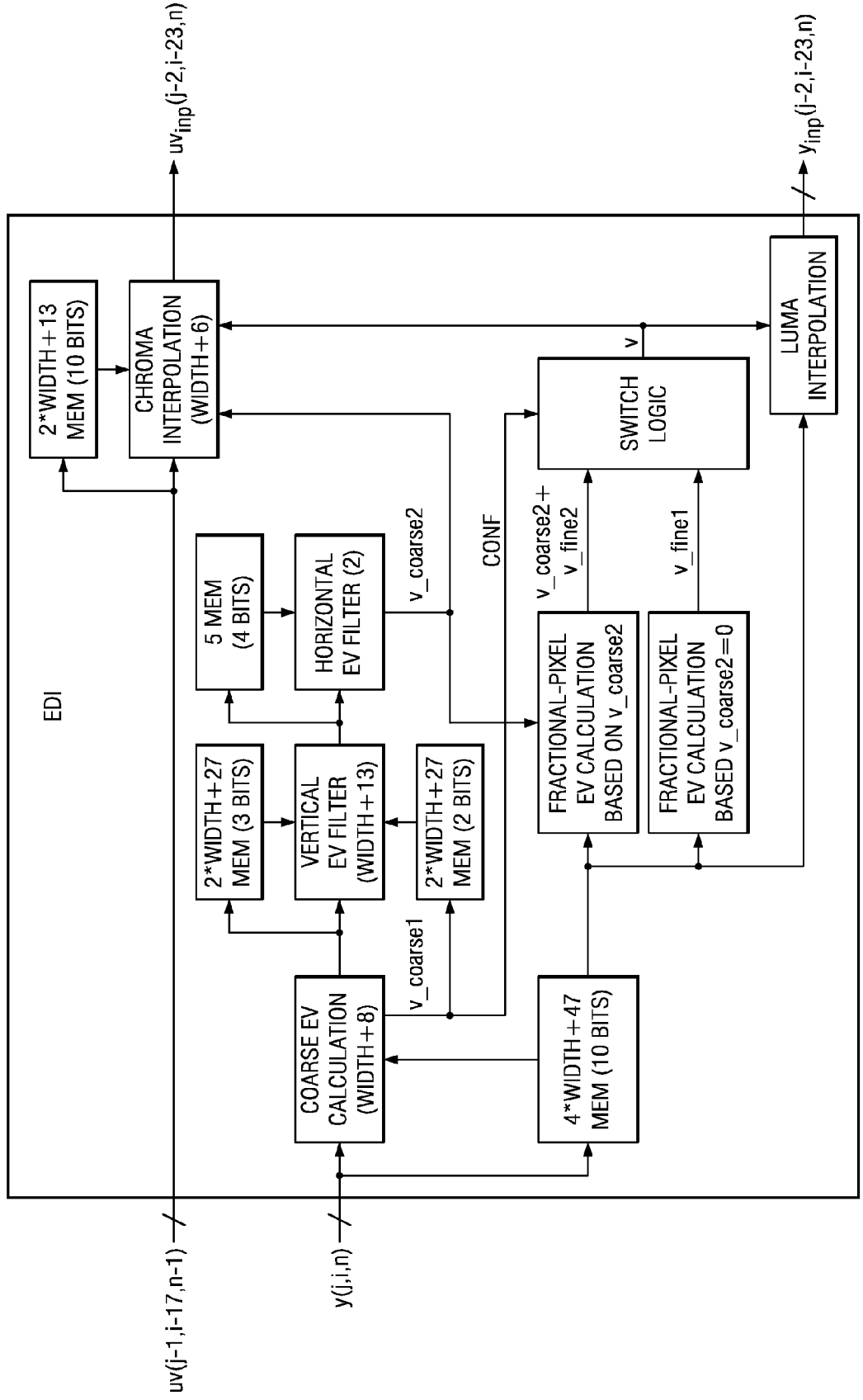
Figure 2A:
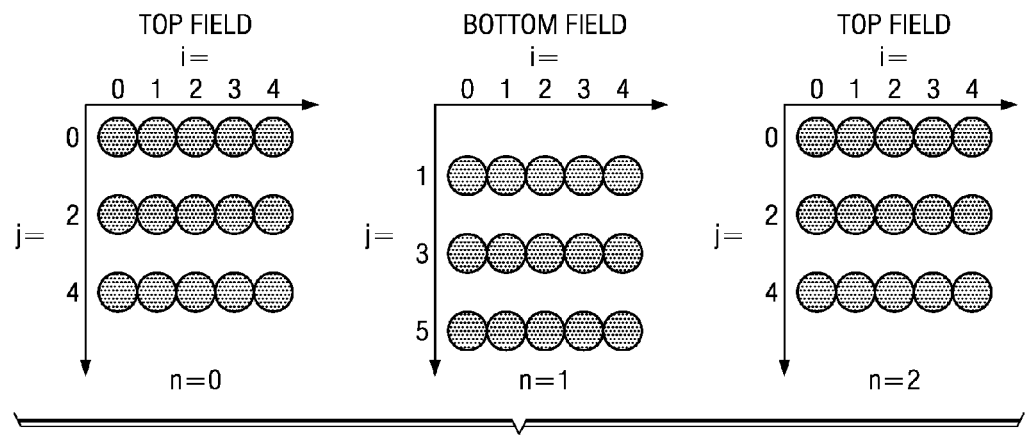
FIGS. 2A-2B show interlaced and progressive frames.
Figure 2B:
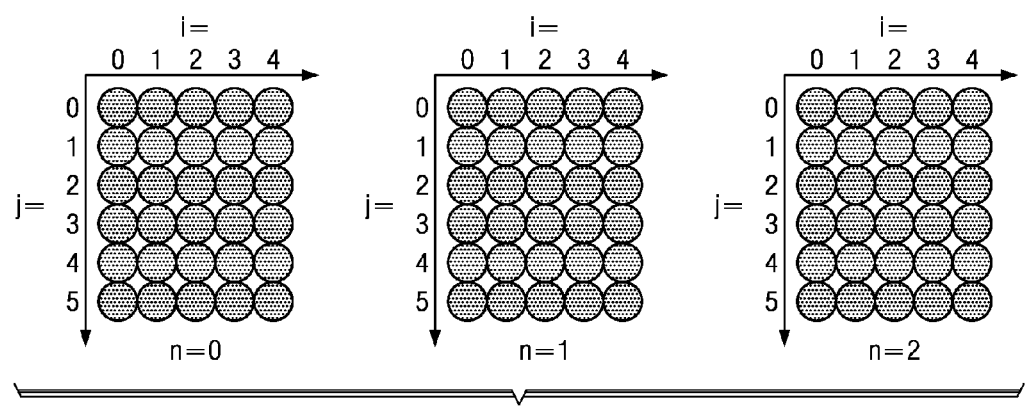

FIG. 1C is a flowchart for SAD analysis in the time domain; and the following pseudocode shows an implementation. Note that the luminance values are in the range 0 to 255 (i.e., 8-bit), "topline" and "botline" are the lines j−1 and j+1, "get_pixels5" gets a block of 5 pixel values, the 13 SADs are in the form of the 13-component array "diff1[ ]" and that weights (diff_weight[ ]) are added which de-emphasize the SADs corresponding to 5-pixel blocks away from the window center:

```
diff_weight[ ] = {12,10,8,6,4,2,0,2,4,6,8,10,12};
    for (m=-6;m<=6; m++){
       get_pixels5(top, topline, i+m);
       get_pixels5(bot, botline, i-m);
       diff1[m+6] = 0; // determine the sum of absolute differences
       for (k=0;k<5;k++)
          diff1[m+6] += abs(top[k]-bot[k]);
    }
    // determine the global minimum and its index
    diff_min = diff1[0]+diff_weight[0];
    ind_min = 0;
    for (k=1 ;k<13;k++){
       if (diff1[k]+diff_weight[k]<diff_min){
          ind_min = k;
          diff_min=diff1[k]+diff_weight[k];
       }
    }
    diff_min1 = diff1[ind_min];
    // determine the minimum within [−2,2] windows
    diff_min2 = diff1[4];
    ind_min2 = 4;
    for (k=4;k<=8;k++){
       if (diff1[k]<diff_min2){
          ind_min2 = k;
          diff_min2 = diff1[ind_min2];
       }
    }
    // determine the maxmum
    diff_max = diff1[0];
    ind_max = 0;
```

```
          for (k=0;k<13;k++){
             if (diff1[k]>diff_max){
                ind_max = k;
                diff_max = diff1[k];
             }
          }
          v_coarse1 = ind_min−6; // corresponding to the global minimum
          // find all local minimums
          // local_min_ind -- the index of local minimums
          // num_local_min -- the number of local minimums
          for (k=0;k<13;k++)
             local_min_ind[k]=0;
          if (diff1[0]<diff1[1]){
             local_min_ind[0]=1;
             m=1;
          }
          else
             m = 0;
          for (k=1 ;k<12;k++){
             if ((diff1[k]<diff1[k−1] && diff1[k]<=diff1[k+1]) || (diff1[k]<=diff1[k−1]
   && diff1[k]<diff1[k+1])){
                local_min_ind[k] = 1;
                m++;
             }
          }
          if (diff1[12]<diff1[11]){
             local_min_ind[12]=1;
             num_local_min = m+1;
          }
          else
             num_local_min = m;
       // determine the distinct local minimums
          for (k=0;k<13;k++)
             dist_min_ind[k]=0;
          if (num_local_min<=1){ // only one local minimum, do nothing
             for (k=0;k<13;k++)
                dist_min_ind[k]=local_min_ind[k];
             num_distinct_min = 1;
          }
          else{ //remove the redundant minimum--obtain distinct local minimums
             if (local_min_ind[0]==1 && diff1[0]-diff_ min2<100 ){
                dist_min_ind[0] = 1;
                m=1;
             }
             else
                m=0;
             for (k=1; k<13; k++){
                if (local_min_ind[k]==1 && local_min_ind[k−1]!=1 && diff1[k]-
   diff_min2<100 ){
                   dist_min_ind[k] = 1;
                   m++;
                }
             }
             num_distinct_min = m;
          }
          if (num_distinct_min>1){ // more than 1 distinct minimum
             // determine if there is a distinct minimum in [−2 2] small window
             if (dist_min_ind[ind_min2]==1){
                ind_mmin = ind_min2;
                v_mmin = diff_min2;
             }
             else{ // find the distinct minimum that is closest to the center
                if (dist_min_ind[6]==1){
                   ind_mmin = 6;
                   v_mmin = diff1[6];
                }
                else{
                   for (k=0; k<6; k++){
                      if (dist_min_ind[5−k]==1){
                         ind_mmin = 5−k;
                         v_mmin = diff1[5−k];
                         break;
                      }
                      else if (dist_min_ind[7+k]==1){
                         ind_mmin = 7+k;
                         v_mmin = diff1[7+k];
                         break;
                      }
                   }
                }
             }
```

```
        }
        // If there is a peak betwen the ind_mmin and ind_min (global
        // minimum), then pick ind_mmin
        if (ind_mmin!=ind_min && ind_mmin<=9 && ind_mmin>=3){
            int k1,k2;
            if (ind_mmin>ind_min){
                k1=ind_min; k2=ind_mmin;
            }
            else{
                k1=ind_mmin; k2=ind_min;
            }
            for (k=0;k<13;k++) //for (k=k1;k<=k2;k++)
                if (k>=k1 && k<=k2 && diff1[k]-v_mmin>50){
                    v_coarse1 = ind_mmin-6; // correct v_coarse1
                    break;
                }
        }
    }
}
```

No matter which scheme is used, the pixel-resolution edge vector calculation functional block of FIG. 1A needs to output the correctly-detected edge vector (the most plausible one), "v_coarse1", plus an important variable, the confidence factor "conf", which denotes the level of ambiguity with respect to the detected edge vector. For strong edges, we set a high confidence level. For a busy area, such as texture, irregular object edges, and objects that are smaller than the 2×17 search window, however, the confidence factor is set to a low number. This confidence factor will be used in the decision logic (section 5 below) to decide whether the pixel-resolution edge vector obtained by searching in the 2×17 window will be used or not. Note the last block of pseudocode which sets the "conf" variable.

There are various ways to compute a confidence factor. FIG. 1C is a flowchart for one implementation illustrating how pixel-resolution edge vector and the confidence factors can generated directly on the time domain by observing the 13 SADs as in the foregoing pseudocode.

The following pseudocode provides a preferred embodiment confidence factor which has four levels of confidence:

```
// determine strong local maximum
// find all local maximums (not including redundant max)
local_max_ind[0]=0;
for (k=1;k<12;k++){
    if (diff1[k]>diff1[k-1] && diff1[k]>=diff1[k+1]){
        local_max_ind[k]=1;
    }
}
// remove redundant min (different from dist_min_ind (no comparison to
// diff_min2 here))
local_min_ind2[0]=local_min_ind[0];
for (k=1;k<13;k++){
    if (local_min_ind[k]==local_min_ind[k-1])
        local_min_ind2[k]=0;
    else
        local_min_ind2[k]=local_min_ind[k];
}
// determine strong local maximum
min_It=16384; // Just a big number like inf
for (k=0;k<13;k++){
    local_strong_max[k]=0;
    if (local_min_ind2[k]==1)
        min_It=diff1[k];
    else if (local_max_ind[k]==1 && diff1[k]-min_It>
             (min_It>>3))
        local_strong_max[k]=1;
}
min_rt=16384;
for (k=12;k>=0;k--){
    if (local_min_ind2[k]==1)
        min_rt=diff1[k];
    else if (local_strong_max[k]==1 && diff1[k]-min_rt<=
             (min_rt>>3))
        local_strong_max[k]=0;
}
// determine the number of minimums in the [-2 2] small
    window.
num_min_sw=local_min_ind[4]+local_min_ind[5]+lo-
    cal_min_ind[6]+local_min_ind[7]+local_min_ind[8];
// determine the number of minimums in the [-3 3] mid
    window.
num_min_mw=num_min_sw+local_min_ind[3]+local_m-
    in_ind[9];
strong_max_in_sw=0;
strong_max_in_mw=0;
strong_max_in_bw=0;
// determine if there is a strong max in [-1 1] small window.
strong_max_in_sw=local_strong_max[5]+local_strong_
    max[6]+local_strong_max[7];
// determine if there is a strong max in [-2 2] mid window
strong_max_in_mw=strong_max_in_sw+local_strong_max
    [4]+local_strong_max[8];
// determine if there is a strong max in [-4 4] big window
strong_max_in_bw=strong_max_in_mw+local_strong_max
    [2]+local_strong_max[3]+local_strong_max[9]+local_
    strong_max[10];
get_pixels5(top, topline, i+short(*v));
get_pixels5(bot, botline, i-short(*v));
get_pixels5(top5, topline, i);
get_pixels5(bot5, botline, i);
diff_sm[0]=abs(top5[1]-bot5[3]);
diff_sm[1]=abs(top5[2]-bot5[2]);
diff_sm[2]=abs(top5[3]-bot5[1]);
sum_diff=0;
for (k=0;k<5;k++)
    sum_diff+=(abs(top[k]-top[2])+abs(bot[k]-top[2]));
flat_area1=(sum_diff<=32)? 1:0;
flat_area2=(sum_diff<=64)? 1:0;
if (abs(*v)>=2 && abs(top[2]-bot[2])>=96 && minn
        (diff_sm,3)<=48)
    conf=0; // not confident
``` else if (diff_min1>=512 || (num_min_sw>=2 && strong_max_in_sw))
    conf=0; // not confident
else if ((num_min_mw>=2 && strong_max_in_mw)|| strong_max_in_bw>=2)
    conf=1;
else if (flat_area2)
    conf=2; // very confident and relatively flat area, keep the same v
else
    conf=3; // area with details, very confident 3. Edge-Vector Filtering Filtering the edge vector, v_coarse1, is necessary in order to obtain robustness to noise and unreliable pixel-resolution edge detection due to irregular pattern or small objects. To increase reliability, we need to make use of the constraint, which comes from the assumption that objects are usually bigger than a small window size such as 3×3, so that the detected edge vectors in such a small neighborhood should be consistent to each other. For this reason, we can enforce a consistency constraint. This can be achieved by conducting linear low pass filtering on the edge vector field. However, in simulations, we observed that low pass filtering does not always lead to good performance. Another observation is that because we employ a big search window of the size of 2×17, we are somewhat aggressive in the search for pixel-resolution edge vectors. Although we perform spectral analysis and use the confidence factor for protection, it is still possible to get mis-detection, which usually results in a big edge vector (for example, 6 or −6) standing alone with its neighboring small edge vectors. In other words, when there is a mis-detection, usually there is no similar direction edge vector along which the direction that the big edge vector points. One such example can be seen in FIG. 6. In addition, for the objects that are smaller than the search window, the detected edge vector is not reliable, which can also be checked by the consistency of the edge vector field.

Figure 4F:
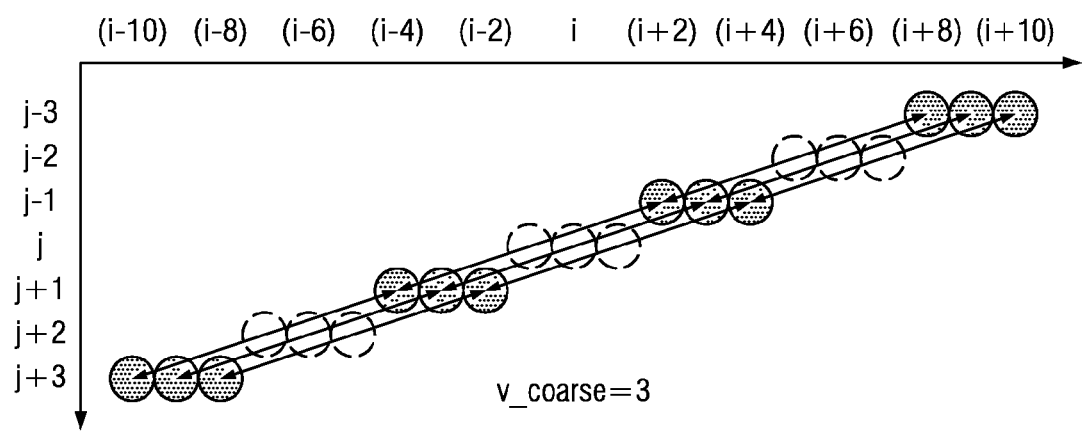
Figure 4G:
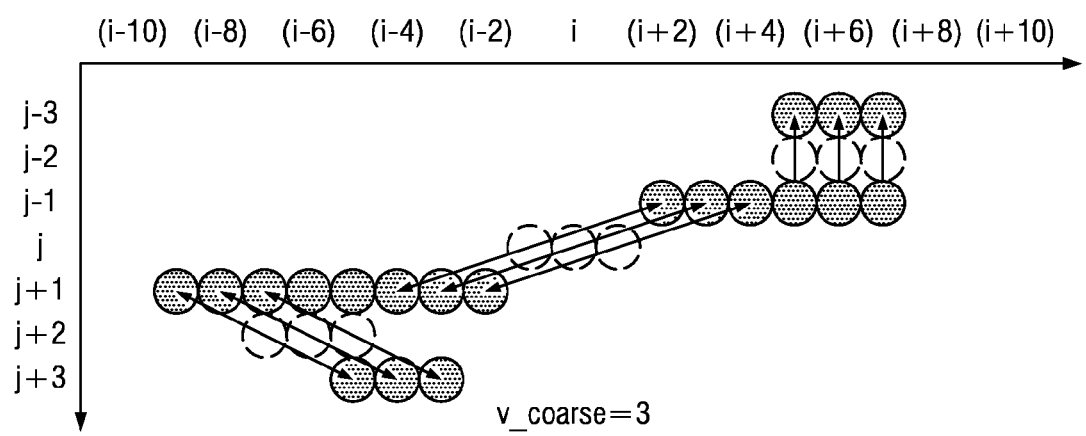

Based on these observations, the first preferred embodiment methods apply a nonlinear approach, which mainly aims to smooth out the mis-detected big edge vectors. For big edge vectors, we first extend the vector along its direction from its left pixel, its pixel, and its right pixel to its top and bottom line pixels. For example, as shown in FIGS. 4F-4G, the edge vector for pixel (j,i) is 3; so along this edge vector, on the top line (j−1), we end up with the pixels F(j−1, i+2), F(j−1,i+3), and F(j−1,i+4), and on the bottom line (j+1) we get pixels F(j+1, i−4), F(j+1,i−3), F(j+1,i−2). We then check the edge vectors of these nine positions. If they (or most of them) have the similar orientation edge vectors, then we are confidence on the resultant edge vector. One such example is shown in FIG. 4F. Otherwise, for example the case in FIG. 4G, we need to smooth out the mis-detected edge vector.

Pseudocode for a first preferred embodiment method of edge vector filtering to smooth out mis-detected edge vectors is:

```
// obtain edge vectors for the 9 pixels in the orientated 3×3 window
// v_coarse1 is the array for pixel-resolution edge vectors
v_cen=v_coarse1[j,i]; // the center pixel being processed
for (k=0;k<3;k++)
{
    v1[k]=v_coarse1[j−1, i−1+k+v];
    v1[k+3]=v_coarse1[j, i−1+k];
    v1[k+6]=v_coarse1[j+1, i−1+k−v];
}
// similarity of the three edge vectors in the top line
// the computation uses the function close_angle which outputs a 1
// if the angle betwee its two vector arguments is less than about 20
// degrees and a 0 otherwise.
v_sim_top=0;
for (k=0;k<3;k++)
    v_sim_top+=close_angle(v1[k],v_cen);
// similarity of the three edge vectors in the mid line
v_sim_mid=0;
for (k=3;k<6;k++)
    v_sim_mid+=close_angle(v1[k],v_cen);
// similarity of the three edge vectors in the bottom line
v_sim_bot=0;
for (k=6;k<9;k++)
    v_sim_bot+=close_angle(v1[k],v_cen);
v_sim=v_sim_top+v_sim_mid+v_sim_bot;
// decision logic
// top_area_flat and bot_area_flat are Boolean variables denoting if
// the top three pixels and the bottom three pixels belong to the flat
//area, using the same scheme as in the foregoing
if (v_sim>=8 || (top_area_flat && v_sim_bot+v_sim_mid>=5) || (bot_area_flat && v_sim_top+v_sim_mid>=5))
    v_coarse2=v_cen;
else
    v_coarse2=0;
```

4. Fractional-Pixel-Resolution Edge Vectors

Figure 4H:
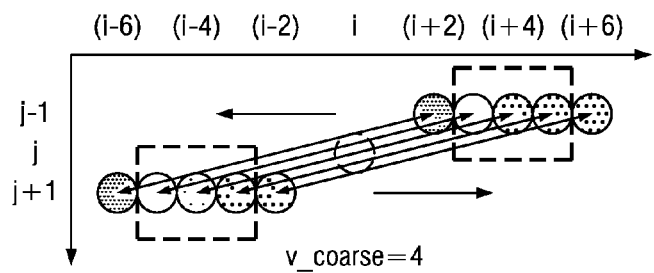
Figure 4I:
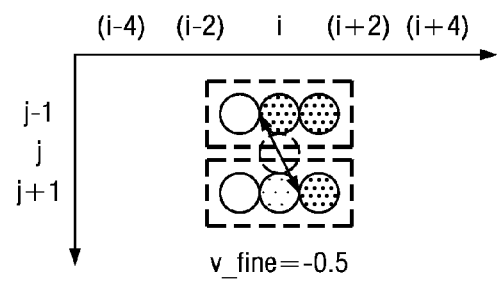

After the pixel-resolution edge vector is determined, the fractional-pixel-resolution refinement edge vector calculation needs to be performed. As shown in FIGS. 4H-4I, we first shift the two blocks of five pixels to the center according to the detected pixel-resolution edge vector. Then we restrict our search in the small 2×3 window, as shown in FIG. 4I, although a 2×5 window is also practical. Note that the top three pixels and bottom three pixels are not the original pixels that are at these places; rather, they are the shifted pixels as shown in FIG. 4H. The reason why we need to restrict our search window to such small size at this stage is because the calculation of fractional-pixel-resolution edge vector is usually relatively complicated. Big windows will greatly increase the computation complexity. In addition, with a reliable pixel-resolution edge vector detected, it is not necessary to search for the fractional-resolution-edge in a big window any more.

Methods based on parametric models can usually accurately calculate the orientation of such small window. The basic idea is to use a parametric model to model the waveforms of the two lines or the whole window, and then use curve fitting to determine the parameters that result in the smallest distortion (usually calculated as squared errors). Examples are the shift-line model or similar methods. Again, various preferred embodiment methods may invoke differing models. All that is needed at this stage is a mechanism to calculate the fractional-pixel-resolution edge vector, v_fine2. The search window can be increased if computation complexity is not an issue in the design.

After the fine-resolution edge vector, v_fine2, is determined, the overall edge vector is then v=v_coarse2+v_fine2. In the example shown in FIGS. 4H-4I, the overall edge vector is 4−0.5=3.5.

Also, the line-shift model method can be used to compute the small window edge vector, v_fine1, which is used when the confidence in v_coarse2 is low resulting in v_coarse2=0.

In this case, use a 2×3 window about the pixel to be interpolated without a shift of a nonzero v_coarse2.

The line-shift model presumes that locally, successive scan lines in an image are just shifts of each other. That is, for a pixel at $(x_0,y_0)$, if the scan line through the pixel has luminance signal $s_0(x)$, then the luminance, $s(x,y)$, for pixels in a small neighborhood about $(x_0,y_0)$ is given by $s(x,y)=s_0(x-v(y-y_0))$ where the v is a velocity (which depends upon $(x_0,y_0)$ and will be the refined edge vector x-component at $(x_0,y_0)$ and not restricted to be an integer). The velocity, v, is estimated by first approximating $s(x,y)$ with a parametric model and by then constraining the velocity vector, $[v,1]$, to be perpendicular to the gradient of $s(x,y)$. Because the gradient can be computed at each point of the neighborhood from the parametric model, estimate v by minimizing the inner product of $[v,1]$ and the gradient over the neighborhood. That is, roughly proceeds as follows. First, approximate with a parametric model:

$$s(x,y) \approx \Sigma_{1 \leq j \leq P} S_j \phi_j(x,y)$$

where $\phi_j(x,y)$ are two-dimensional basis functions in the neighborhood of $(x_0,y_0)$. For a 2×5 neighborhood (i.e., 10 pixel luminance values), take P=5 basis functions as simply $\phi_1(x,y)=1$, $\phi_2(x,y)=x-x_0$, $\phi_3(x,y)=y-y_0$, $\phi_4(x,y)=(x-x_0)^2$, and $\phi_5(x,y)=(x-x_0)(y-y_0)$. This will give an over-determined linear system to solve. Next, find the coefficients $S_j$ by minimizing the approximation error over the neighborhood (i.e., M=10 pixels):

$$\{S_j\}=\operatorname{argmin}[\Sigma_{1 \leq k \leq M} |s(x_k,y_k) - \Sigma_{1 \leq j \leq P} S_j \phi_j(x_k,y_k)|^2]$$

Then compute the gradient of $s(x,y)$ at each $(x_k,y_k)$ as $$\partial s(x_k,y_k)/\partial x = \sum_{1 \leq j \leq P} S_j \partial \phi_j(x_k,y_k)/\partial x$$
$$= S_2 + S_4 2(x_k - x_0) + S_5(y_k - y_0)$$
$$\partial s(x_k,y_k)/\partial y = \sum_{1 \leq j \leq P} S_j \partial \phi_j(x_k,y_k)/\partial y$$
$$= S_3 + S_5(x_k - x_0)$$

Lastly, the constraint on v becomes the minimization:

$$v=\operatorname{argmin}[\Sigma_{1 \leq k \leq M} |v(S_2+S_4 2(x_k-x_0)+S_5(y_k+y_0))+S_3+S_5(x_k-x_0)|^2]$$

Similarly, for a 2×3 neighborhood (i.e., 6 pixel luminance values), take P=3 basis functions as simply $\phi_1(x,y)=1$, $\phi_2(x,y)=x-x_0$, and $\phi_3(x,y)=y-y_0$. Next, find the coefficients $S_j$ by minimizing the approximation error over the neighborhood (i.e., M=6 pixels):

$$\{S_j\}=\operatorname{argmin}[\Sigma_{1 \leq k \leq M} |s(x_k,y_k) - \Sigma_{1 \leq j \leq P} S_j \phi_j(x_k,y_k)|^2]$$

Then compute the gradient of $s(x,y)$ at each $(x_k,y_k)$ as $$\partial s(x_k,y_k)/\partial x = \sum_{1 \leq j \leq P} S_j \partial \phi_j(x_k,y_k)/\partial x$$
$$= S_2$$
$$\partial s(x_k,y_k)/\partial y = \sum_{1 \leq j \leq P} S_j \partial \phi_j(x_k,y_k)/\partial y$$
$$= S_3$$

Lastly, the constraint on v becomes the minimization:

$$v=\operatorname{argmin}[\Sigma_{1 \leq k \leq M} |vS_2+S_3|^2]$$

which is simply: $v=-S_3/S_2$.

U.S. Pat. No. 5,226,114 provides details of the line-shift model.

Another approach to finding a small window refinement edge vector uses a bilinear interpolation scheme. For example, quarter-pixel resolution using a 2×5 window proceeds by first linearly interpolating at the quarter pixel locations in both the top and bottom lines. Then with two parallel groups of three (quarter) pixels (with pixel spacing), find the minimum of the nine possible SADs; this gives a quarter-pixel-resolution edge vector in the range of −1 to 1. The following pseudocode is a possible implementation.

```
// obtain the pixel values in the 2×5 window surrounding the pixel
// being interpolated
for (k=0; k<5; k++)
{
    top[k]=F(j−1,i−2+k);
    bot[k]=F(j+1,i−2+k);
}
// interpolate to quarter pixel locations
for (m=0;m<4;m++)
{
    q_top[m]=((4−m)*top[0]+m*top[1])/4;
    q_bot[m]=((4−m)*bot[0]+m*bot[1])/4;
    q_top[4+m]=((4−m)*top[1]+m*top[2])/4;
    q_bot[4+m]=((4−m)*bot[1]+m*bot[2])/4;
    q_top[8+m]=((4−m)*top[2]+m*top[3])/4;
    q_bot[8+m]=((4−m)*bot[2]+m*bot[3])/4;
    q_top[12+m]=((4−m)*top[3]+m*top[4])/4;
    q_bot[12+m]=((4−m)*bot[3]+m*bot[4])/4;
}
q_top[16]=top[4];
q_bot[16]=bot[4];
// the 9 SADs for quarter pixels in groups of 3
for (n=0;n<9;n++)
{
    q_diff[n]=abs(q_top[n]−q_bot[8−n])+abs(q_top[4+n]−
        q_bot[12−n])+abs(q_top[8+n]−q_bot[16−n]);
}
// pick the minimum SAD to define the refinement edge vector
min_q_index=0;
min_q_diff=q_diff[0];
for (n=1;n<9;n++)
{
    if (q_diff[n]<min_q_diff)
    {
        min_q_diff=q_diff[n];
        min_q_index=n;
    }
}
quarter_edge_vector_times4=min_q_index−4;
```

5. Decision logic

At this stage, we need to determine which edge vector should be used based upon the confidence level obtained. Generally, if we are very confident on our detected pixel-resolution edge vector using the big search window, then we can further refine the edge vector based on v_coarse2. Otherwise, we have to set v_coarse2 to 0, and constraint our search within the small search window, which will generate edge vector v_fine1. The following pseudocode shows one example implementation of the decision logic, which is based the 4-level confidence factors given in the implementation in section 2. In this pseudocode, the variable v_sim comes from the pseudocode in section 4.

```
v1=v_fine1; // small window result only
v2=v_coarse2+v_fine2; // big+small window result
```

```
if (conf==3) // very confident
    v=v2;
else if (conf==2) // flat area
    v=v2;
else if (conf==1){
    if (v_sim>=7) // edge vectors in a oriented 3×3 window
        // have same orientation
        v=v2;
    else
        v=v1;
}
else // conf==0
    v=v1;
```

Thus the overall hierarchical edge vector detection has the following steps to find the edge vector field (all edge vectors for pixel locations needing interpolation) of an interlaced field:
(a) find the coarse resolution edge vector, "v_coarse", within the range of −6 to 6 as minimum SAD over large window about the pixel location to interpolate.
(b) determine true v_coarse and confidence factor, "conf".
(c) evaluate the correlation of big vectors (v_coarse) in a 3×3 oriented window.
(d) if (conf>threshold), detect a fractional-pixel-resolution refinement edge vector, v_fine, using a v_coarse-adjusted 2×3 window (that is, shift the upper line by v to the left and the lower line v to the right);
else, take v_coarse=0 and detect refinement edge vector, v_fine, using a 2×3 window.
(e) edge vector: v=v_coarse+v_fine.
(f) 1×5 median filtering of the v's in lines of pixels to interpolate to further smooth the edge vector field.

6. Edge-Directed Interpolation

Given the detected edge vector, v, the final task is to do interpolation to generate the missing pixel value.

Figure 4J:
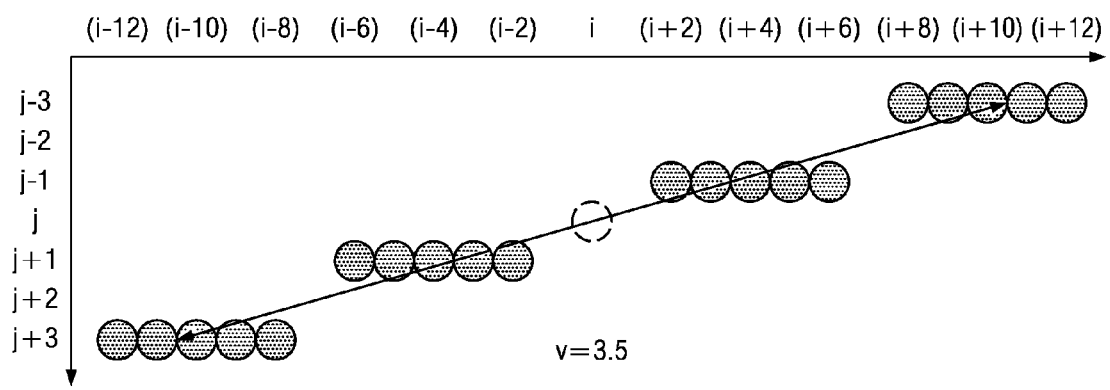

The interpolation consists of two steps: horizontal interpolation and vertical (diagonal) interpolation. As shown in FIG. 4J, we consider four horizontal lines by extending the edge vector v to the top and bottom lines. In this figure, we consider interpolation for pixel (j,i). If the detected edge vector, v, is 3.5, by extending the edge line to its top line (the line j−1) and its bottom line (the line j+1) we need to find the pixel values at the fractional-integer positioned between the top-line pixels at (j−1,i+3) and (j−1,i+4), and also between the bottom line pixels (j+1,i−4) and (j+1,i−3), respectively. The pixel values at those two fractional-integer positions can be obtained through horizontal interpolations in the top line and in the bottom line, respectively. Various interpolation methods can be used; the simplest method is linear interpolation of adjacent pixels. More advanced methods, such as polyphase filtering and Hermite cubic spline interpolation, can also be used to improve the interpolation performance by maintaining more of the horizontal high frequency spectrum. In order to enhance vertical resolution, we can extend the edge vector to the next top and bottom lines: line (j−3) and line (j+3), in addition to top and bottom lines (j−1) and (j+1). This is achieved by extending the edge, and the resulted edge vectors will be 3v and −3v for the lines (j−3) and (j−3), respectively, with respect to the pixel at (j,i). Again for the example of FIG. 4J, the position in line (j−3) pointed to by the extended edge vector will be the middle of pixel (j−3,i+10) and pixel (j−3, i+11). Similarly, at the line (j+3), the position would be the middle of pixel (j+3,i−11) and pixel (j+3,i−10). After these four pixel values along the edge are determined through horizontal interpolation, a vertical half-band filter is applied to generate the value for pixel (j,i), if the four pixels are correlated. In a preferred embodiment implementation, this filter has coefficients (−3, 19, 19, −3)/32. So we have, $$F^{(int)}(j,i)=[-3*F^{(hor)}(j-3,i+3v)+19*F^{(hor)}(j-1,i+v)+19*F^{(hor)}(j+1,i-v)-3*F^{(hor)}(j+3,i-3v)]/32$$

where $F^{(hor)}(m,x)$ is the horizontally interpolated pixel value at line m and (fractional-integer) horizontal position x.

If the four pixels are not correlated, then we use the two interpolated pixels on line (j−1) and on line (j+1) and perform linear interpolation. That is, $$F^{(int)}(j,i)=[F^{(hor)}(j-1,i+v)+F^{(hor)}(j+1,i-v)]/2$$

The implementation block diagram of the diagonal interpolation is shown in FIG. 1D.

In FIG. 1D, in addition to luma, we also include edge-directed interpolation for chroma. In order for them to be aligned, chroma needs to be further delayed. The blocks show the memory needed for each block processing. The numbers in the parenthesis in the blocks denote the delay introduced by that block. Again, this is just one realization of the scheme in FIG. 1B.

7. Modifications

The preferred embodiments may be modified in various ways while retaining the feature of hierarchical edge vector determination.

For example, both the coarse and fine vector determination methods could be varied; the window sizes varied such as 2×11, 2×13, 2×15, 2×19 for the pixel-resolution window; the confidence levels computed differently; etc.

What is claimed is:

1. A method of edge vector determination for de-interlacing interpolation of a video field, comprising the steps of:
   (a) for a target pixel to be found by intra-field interpolation, computing a first edge vector for said target pixel, said first edge vector with pixel-resolution and within the range of −N to N, wherein N is an integer greater than 4;
   (b) determining a confidence factor for said pixel-resolution edge vector;
   (c) when said confidence factor is greater than a threshold, computing a first refinement edge vector for said target pixel, said first refinement edge vector with sub-pixel-resolution and said computing by shifting field lines about said target pixel according to said first edge vector and then finding a sub-pixel-resolution edge vector in a window of shifted field pixels about said target pixel;
   (d) when said confidence factor is not greater than said threshold, setting said first edge vector equal to 0 and computing a first refinement edge vector for said target pixel, said first refinement edge vector with sub-pixel-resolution and said computing by finding a sub-pixel-resolution edge vector in a window of field pixels about said target pixel; and
   (e) after said computing a first refinement edge vector, computing a final edge vector for said target pixel as the sum of said first edge vector and said first refinement edge vector.

2. The method of claim 1, wherein said computing a first edge vector includes minimizing a measure of the differences of field pixels over a window about said target pixel.

3. The method of claim 1, further comprising the step of:
   (a) after said computing a first edge vector, evaluating correlations of said first edge vector with edge vectors computed for pixels to be found by interpolation and in a 3×3 oriented window about said target pixel; and
   (b) when said correlations are less than second thresholds, setting said first edge vector equal to 0.

4. The method of claim 1, further comprising the step of:
(a) after said computing a final edge vector, median filtering with final edge vectors for pixels adjacent to said target pixel.

5. A method of de-interlacing a stream of video fields, comprising the steps of:
(a) for a target pixel to be found by interpolation, detecting whether said target pixel is to have inter-field interpolation or intra-field interpolation or a blend of inter-field and intra-field interpolations;
(b) for intra-field interpolation for said target pixel, computing a first edge vector for said target pixel, said first edge vector with pixel-resolution and within the range of −N to N, wherein N is an integer greater than 4;
(c) determining a confidence factor for said pixel-resolution edge vector;
(d) when said confidence factor is greater than a threshold, computing a first refinement edge vector for said target pixel, said first refinement edge vector with sub-pixel-resolution and said computing by shifting field lines about said target pixel according to said first edge vector and then finding a sub-pixel-resolution edge vector in a window of shifted field pixels about said target pixel;
(e) when said confidence factor is not greater than said threshold, setting said first edge vector equal to 0 and computing a first refinement edge vector for said target pixel, said first refinement edge vector with sub-pixel-resolution and said computing by finding a sub-pixel-resolution edge vector in a window of field pixels about said target pixel; and
(f) after said computing a first refinement edge vector, computing a final edge vector for said target pixel as the sum of said first edge vector and said first refinement edge vector.

* * * * *